United States Patent [19]

Lech, Jr. et al.

[11] Patent Number: 4,679,679

[45] Date of Patent: Jul. 14, 1987

[54] CLUTCH DRIVEN PLATE ASSEMBLY WITH ANTI-BACKLASH DAMPING

[75] Inventors: Thaddeus Lech, Jr., Sterling Heights; Bruce A. Mullard, Mt. Clemens, both of Mich.

[73] Assignee: Borg-Warner Automotive, Inc., Troy, Mich.

[21] Appl. No.: 754,040

[22] Filed: Jul. 11, 1985

[51] Int. Cl.$^4$ .......................... F16D 3/14; F16D 3/66
[52] U.S. Cl. ........................ 192/106.2; 192/106.1; 464/68
[58] Field of Search ............... 192/106.1, 106.2, 70.17; 464/160, 68, 64, 66, 67; 74/440

[56] References Cited

U.S. PATENT DOCUMENTS

| | | | |
|---|---|---|---|
| 1,587,724 | 6/1926 | Harley | 464/160 X |
| 1,807,798 | 6/1931 | Short | 74/574 |
| 1,967,052 | 7/1934 | Dumm | 192/106.1 X |
| 2,017,591 | 10/1935 | Dumm | 464/37 X |
| 2,745,268 | 5/1956 | Reed | 64/27 |
| 2,853,862 | 9/1958 | Thelander | 64/27 |
| 2,909,047 | 10/1959 | Walterscheid-Muller et al. | 192/56 R X |
| 3,252,300 | 5/1966 | Hofmann | 64/27 |
| 4,043,437 | 8/1977 | Taylor | 192/13 R |
| 4,046,237 | 9/1977 | Root et al. | 192/37 R |
| 4,068,749 | 1/1978 | Antrim | 192/106.1 |
| 4,185,728 | 1/1980 | Gatewood | 192/106.2 |
| 4,222,475 | 9/1980 | Fenart | 192/106.2 |
| 4,241,818 | 12/1980 | Miller | 192/55 |
| 4,433,770 | 2/1984 | Loizeau et al. | 192/70.17 X |
| 4,614,261 | 9/1986 | Takeuchi | 192/106.2 |
| 4,615,426 | 10/1986 | Lech, Jr. | 192/106.2 |

Primary Examiner—Rodney H. Bonck
Assistant Examiner—Richard M. Lorence
Attorney, Agent, or Firm—James A. Geppert

[57] ABSTRACT

A clutch driven plate assembly for use in an automotive vehicle and having anti-backlash damping adapted to dissipate the irregular impulses of the vehicle internal combustion or diesel engine with the transmission in neutral, the clutch engaged and the engine at idle rpm. The assembly includes a clutch plate, a spring retainer plate secured to the clutch plate, and a hub assembly comprising an inner hub in operative engagement with the transmission input shaft and an outer hub having an integral hub flange with spring windows coinciding with the spring windows of the clutch and spring retainer plates. An intermeshing backlash spline loosely connects said inner and outer hubs to allow limited rlative rotation therebetween and means yieldably resisting relative rotation of said hubs includes a plurality of circumferentially equally spaced recesses in one hub and a plurality of plungers and compression springs in the other hub with the plungers biased by the springs into engagement with complementary recesses. Rotation of the clutch and spring retainer plates, damper springs and outer hub relative to the inner hub causes the plungers to be cammed out of the recesses against the force of the compression springs.

9 Claims, 10 Drawing Figures

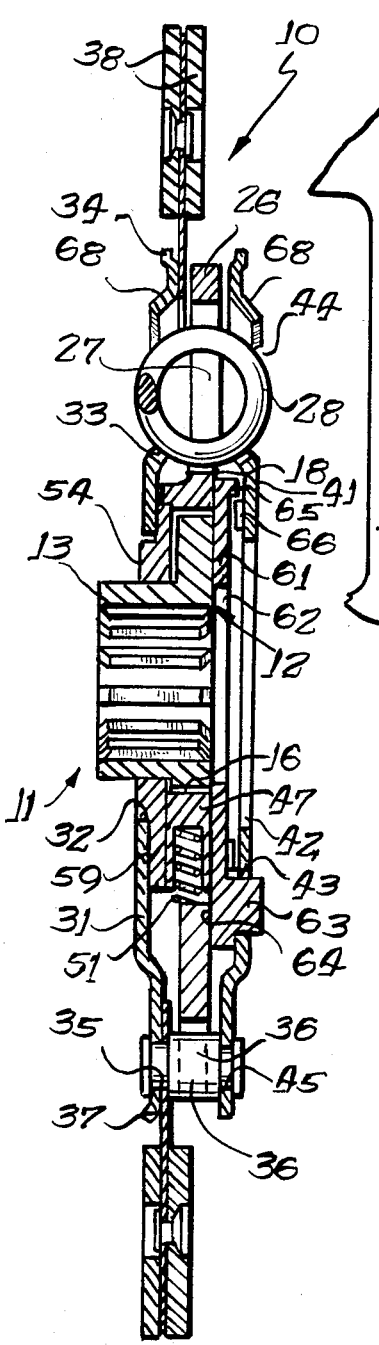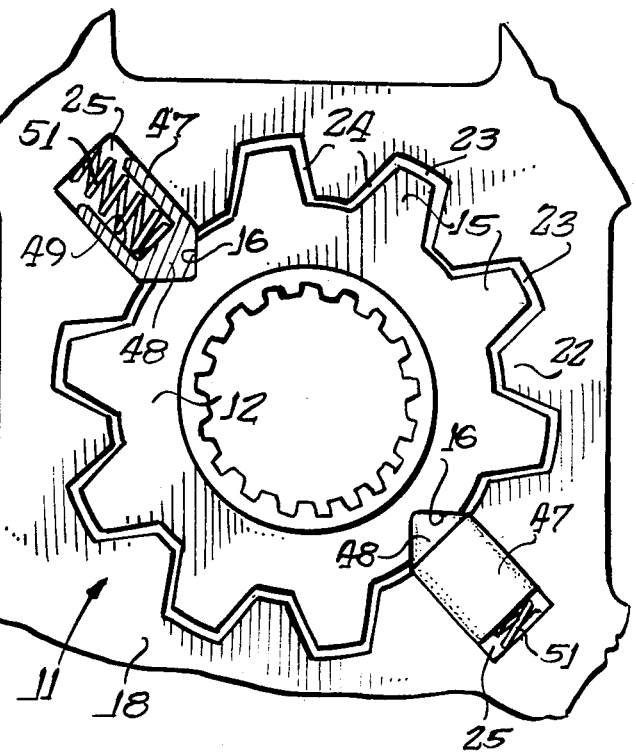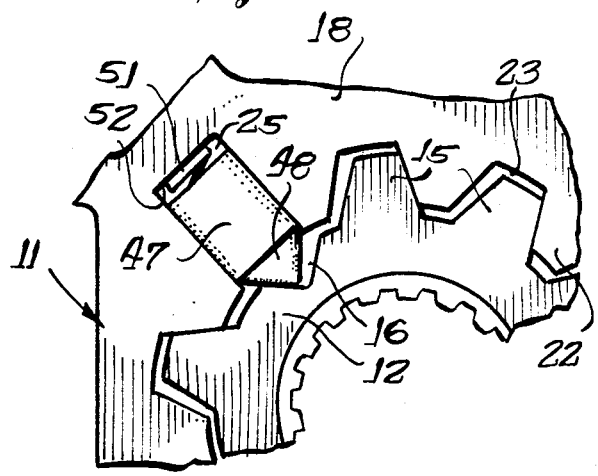

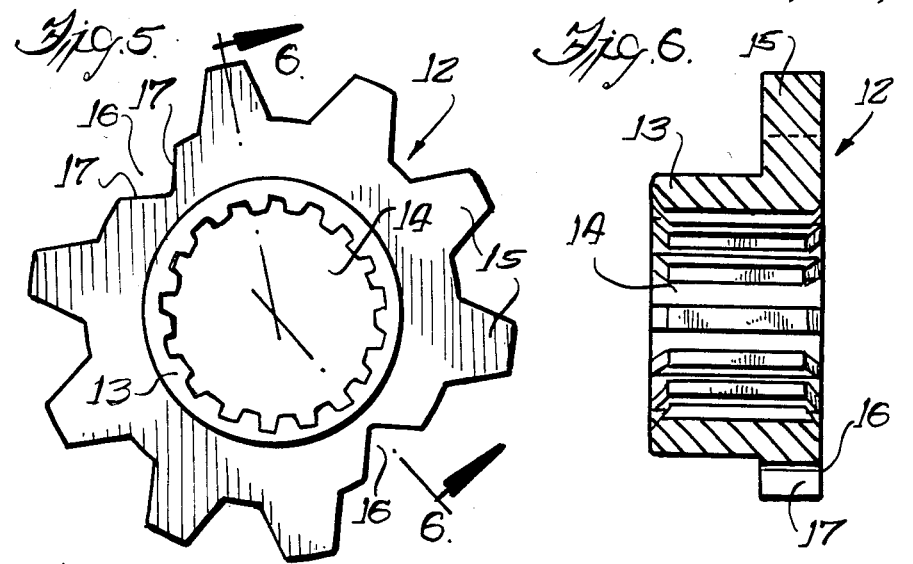
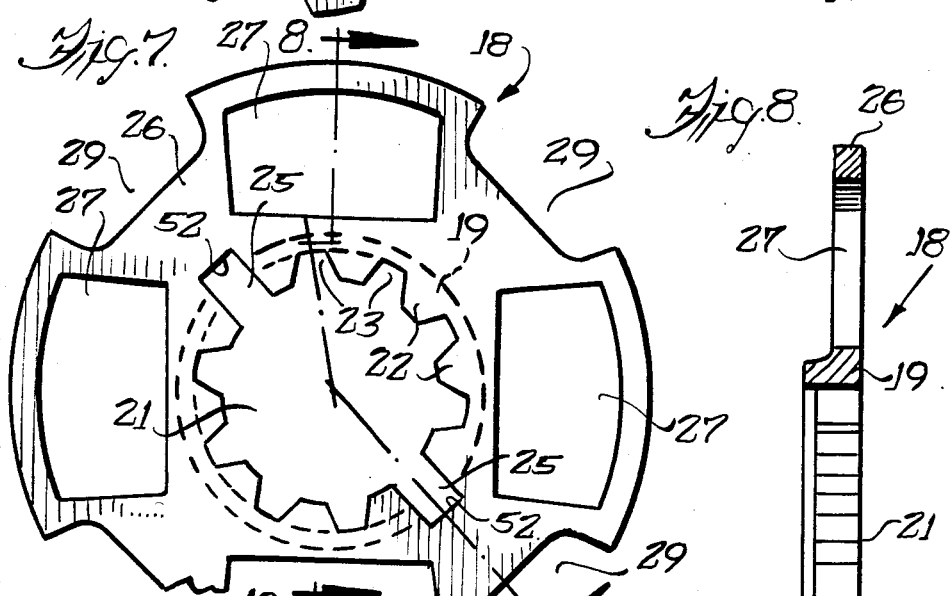
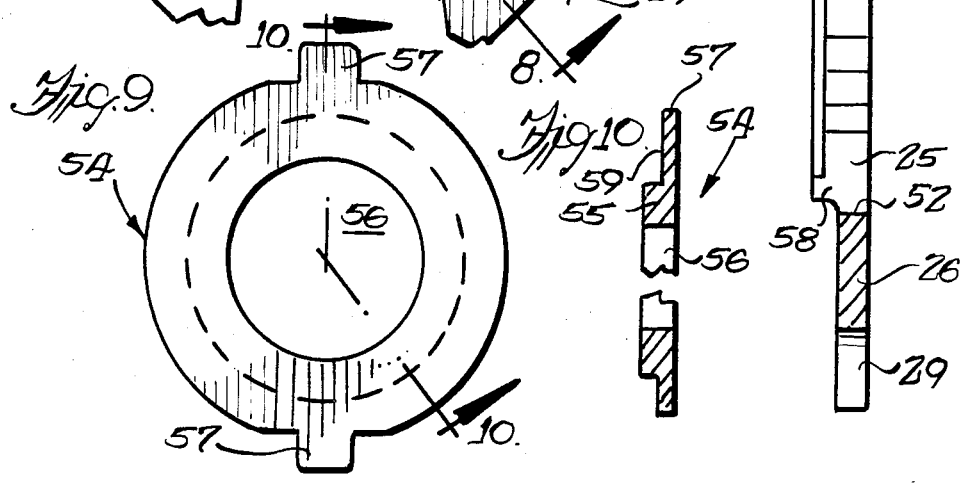

CLUTCH DRIVEN PLATE ASSEMBLY WITH ANTI-BACKLASH DAMPING

BACKGROUND OF THE INVENTION

In a conventional friction clutch for an automotive vehicle having a manual transmission, the vehicle engine produces power and inertia impulses which drive an engaged clutch with an irregular series of thrusts with the transmission in neutral and the engine at idle rpm. These impulses will be transmitted through the clutch and transmission input shaft to the transmission gears which become excited, resulting in oscillation through their backlash space to produce objectionable rattle. In U.S. Pat. No. 4,446,955, a driven plate assembly is disclosed utilizing a helical connection between an inner hub and an outer hub to allow relative axial movement between the hubs to dissipate the engine impulses. Also, in U.S. patent application Ser. No. 556,518 now U.S. Pat. No. 4,615,426 an axially oriented spring-loaded detent between the hub and a retainer is shown for the same purpose. The present invention relates to another approach to this problem to simplify construction of the clutch assembly.

SUMMARY OF THE INVENTION

The present invention comprehends the provision of a clutch driven plate assembly having a novel two-part hub assembly with an intermeshed backlashing spline between the hub parts and means to yieldably resist relative rotation between the hub parts to dissipate engine impulses which had previously resulted in objectionable transmission gear rattle with the clutch engaged, the transmission in neutral and the engine at idle rpm. The hub assembly includes an inner hub having a hub barrel in operative engagement with the transmission input shaft and radially extending external splines, and an outer hub having a small barrel with an integral radial flange having spring windows axially aligned with the spring windows formed in the clutch driven and spring retainer plates; the clutch plate carrying the clutch friction facings at its periphery. The outer hub includes a central opening generally comforming to the inner hub splines but of such dimensions to allow limited relative rotation therebetween. The yieldable means includes resiliently biased plungers acting in a radial direction which are cammed out of the complementary recesses during the initial rotational travel of the clutch and spring retainer plates, damper springs and outer hub relative to the inner hub.

The present invention also comprehends the provision of a clutch driven plate assembly having a novel means to produce a low rate spring force between the drive and coast portions of the normal damper travel to absorb engine impulses. Such means comprises an inner hub having a pair of diametrically opposed V notches between the splines, and a pair of spring-loaded plungers located in the outer hub to project radially inwardly into the V notches. Rotation of the outer hub relative to the inner hub causes the plungers to be cammed out of the V notches and compress the small compression springs producing a low rate spring force to absorb the engine impulses.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is a cross sectional view of the assembly taken on the irregular line 2—2 of FIG. 1.

FIG. 3 is an enlarged partial elevational view of the intermeshing backlashing splines and yieldable means between the inner and outer hubs positioned in the absence of applied torque.

FIG. 4 is an enlarged partial elevational view similar to FIG. 3, but with torque applied in one direction of movement.

FIG. 5 is an enlarged rear elevational view of the inner hub.

FIG. 6 is a cross sectional view taken on the irregular line 6—6 of FIG. 5.

FIG. 7 is a rear elevational view with a portion broken away of the outer hub.

FIG. 8 is a cross sectional view taken on the irregular line 8—8 of FIG. 7.

FIG. 9 is a rear elevational view of a spacer piloting the inner hub in the outer hub.

FIG. 10 is a cross sectional view taken on the line 10—10 of FIG. 9.

DESCRIPTION OF THE PREFERRED EMBODIMENT

Figure 1:
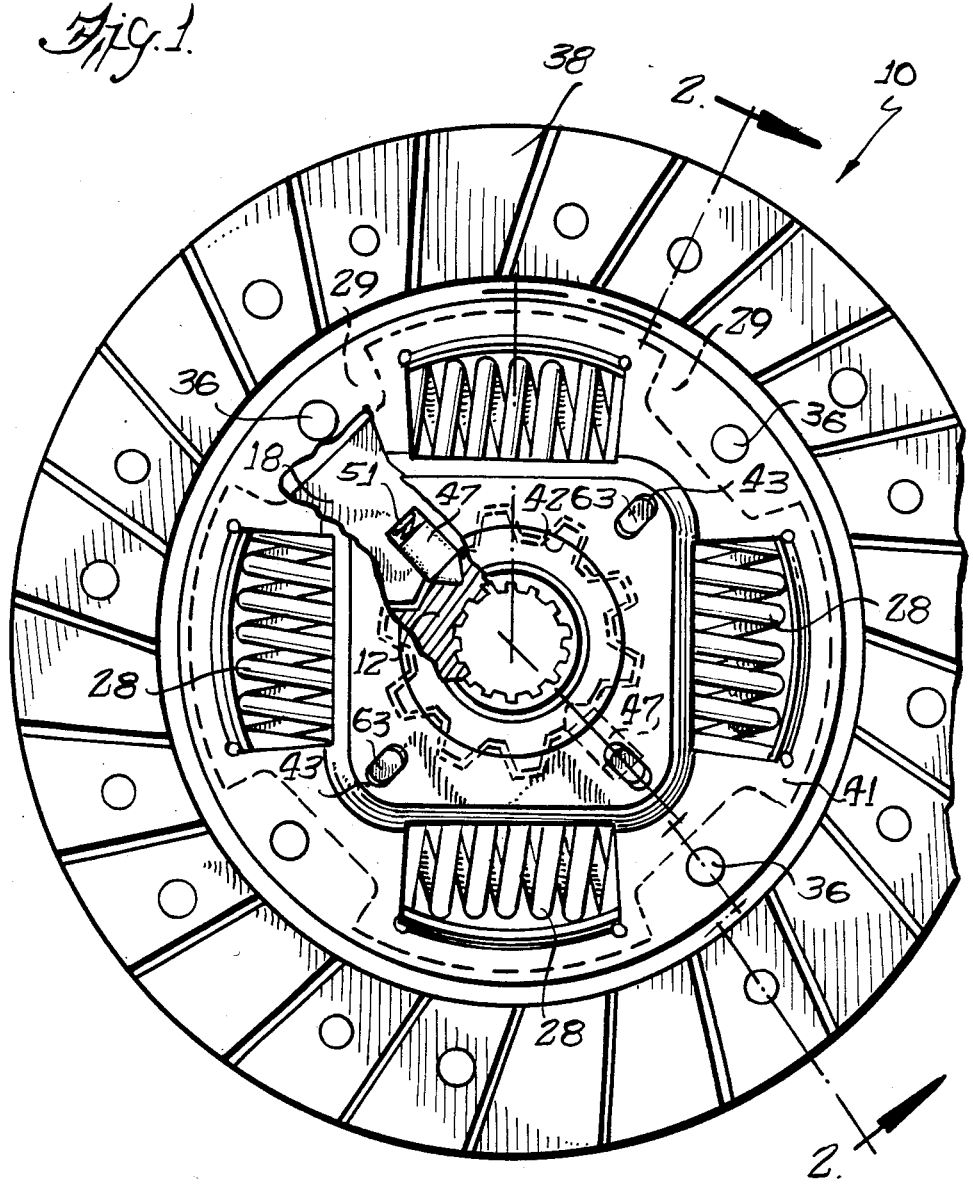
FIG. 1 is a rear elevational view with portions broken away of a clutch driven plate assembly embodying the present invention.

Referring more particularly to the disclosure in the drawings wherein is shown an illustrative embodiment of the present invention, FIGS. 1 and 2 disclose a clutch driven plate assembly 10 including a hub assembly 11, a clutch plate 31 carrying friction facings 38 mounted on the periphery thereof and adapted to be positioned between friction surfaces of a flywheel and a pressure plate (not shown) for the vehicle clutch, and a spring retainer plate 41. The hub assembly 11 includes an inner hub 12 (FIGS. 5 and 6) having a barrel 13 with a splined central opening 14 receiving the splined end of a transmission input shaft (not shown) and a plurality of integral radial splines 15. Located between the splines 15 are a pair of diametrically opposed V notches 16 forming camming surfaces 17 for a purpose to be later described.

An outer hub 18 (FIGS. 7 and 8) includes a short hub barrel 19 having a central opening 21 formed with splines 22 separated by notches 23 loosely receiving the splines 15 of the outer hub. As seen in FIG. 3, there is sufficient clearance between the splines 15 and notches 23 to provide a backlash space 24 to allow limited relative rotation between the hubs. Also, positioned between the splines are a pair of diametrically opposed radially extending recesses 25 normally radially aligned with the V notches 16. An integral radial flange 26 on the barrel 19 contains spring windows 27 for damper spring 28, and elongated notches 29 are formed on the periphery of the flange.

The clutch driven plate 31 has a central opening 32, a plurality of circumferentially equally spaced spring windows 33, and an outer periphery 34 containing a plurality of openings 35 arranged in a circle; the openings receiving spacer pins 36 to secure a one-piece cushioning plate 37 thereto; the plate carrying the opposed friction facings 38 for the clutch secured thereto.

The spring retainer plate 41 (FIGS. 1 and 2) has a central opening 42, a plurality of circumferentially spaced inner slots 43, a plurality of circumferentially equally spaced arcuate spring windows 44 axially aligned with the windows 27 and 33 of the outer hub flange 26 and clutch plate 31, respectively, and a plurality of openings 45 in its periphery axially aligned with openings 35 to receive spacer rivets 36 securing the clutch plate 31 and spring retainer plate 41 together; the rivets extending through the elongated notches 29 in the outer hub flange periphery.

Located in the radial recesses 26 in the outer hub are a pair of plungers 47, each having a camming nose 48 complementary to a V-notch 16 and rearwardly opening recess 49 to receive one end of a low rate compression spring 51, the opposite end of the spring abutting the closed end 52 of the recess 25. Each plunger 47 is yieldably biased into substantially complete engagement in its associated notch 16 in the absence of applied torque (FIG. 3).

Journalled on the inner hub barrel 13 is a generally circular spacer 54 with an inner hub portion 55 received in the clutch plate central opening 32 and having a central opening 56 receiving the inner hub barrel 13, and a pair of diametrically oppositely disposed radial locating tabs 57 received in notches 58 formed in the forward surface of the outer hub barrel 19. The spacer provides a friction surface 59 engaging the clutch plate 31 and pilots the inner hub central to the outer hub, the friction surface 59 providing friction damping or lag during normal damper operation when the spacer rotates with the outer hub. On the opposite side of the hub assembly is a second generally annular spacer 61 having a central opening 62, a plurality of spaced rearwardly extending anti-rotation tabs 63 projecting into the slots 43 in the spring retainer plate 41, a friction surface 64 engaging the inner and outer hubs, and a rearwardly extending stop 65 to prevent a wave spring 66 between the spacer 61 and plate 41 from being compressed to solid; the spacer 61 piloting the wave spring 66. The inner hub 12, plungers 47 and springs 51 are trapped in place axially by the spacers 54 and 61.

One or more concentric damper springs 28 are located in each aligned set of spring windows 33,44 and 27 in the plates and outer hub flange, with the plate windows 33 and 44 having inclined lips 68 to retain the springs in operative position. As seen in FIG. 1, the spring windows 27 in the outer hub flange 26 and the clutch and spring retainer plate windows 33 and 44 have the same circumferential dimension so that the outer hub, plates and damper springs can rotate together.

In the normal position of the hub assembly with the clutch engaged and no torque applied, as seen in FIGS. 1 and 3, the plungers 47 are resiliently biased into engagement in the complementary V notches or recesses 16 in the inner hub. This clutch assembly operates in the same manner as a conventional assembly except for the action of the plungers in the hub assembly at idle rpm and in neutral transmission position. With the clutch plate engaged between the flywheel and pressure plate, the engine impulses during idle act to rotate the clutch plate 31, spring retainer plate 41, damper springs 28 and outer hub 18 relative to the inner hub 12 due to the backlash space 24. This relative rotation between the inner and outer hubs causes the plungers 47 to cam out of the recesses 16 in the inner hub against the force of the compression springs 51 to produce a resilient cushioning and prevent gear rattle (see FIG. 4). Movement continues until the splines and notches in the inner and outer hubs are in engagement. The energy of the impulses is used to actuate the plungers in the above manner rather than transmit the undiminished impulses to the vehicle transmission to cause its gears to rattle.

In the normal driving mode of the vehicle, the plates 31,41 move against the damper springs 28 to compress them upon torque application to the friction facings, which will dampen the vibrations of the drive train to the hub assembly in a conventional manner. Although shown with a pair of plungers received in a pair of mating camming recesses or notches, obviously more than two plungers and corresponding recesses could be utilized in the present construction.

We claim:

1. A clutch driven plate assembly for an automotive vehicle clutch driving a transmission input shaft, including a hub assembly having an inner hub with a barrel splined onto the input shaft and an outer hub having a radial flange, a clutch plate carrying friction facings at the outer periphery thereof, a spring retainer plate secured to the clutch plate to sandwich said outer hub flange therebetween, said plates and outer hub flange having axially aligned sets of circumferentially spaced windows therein, and damper springs received in each set of windows, the improvement comprising intermeshing backlash splines on said inner and outer hubs allowing limited relative rotation therebetween, means yieldable resisting relative rotation between said hubs including at least two radially-biased plungers in one hub and a plurality of camming recesses in said other hub corresponding to the number of plungers, so that rotation of said plates, damper springs and outer hub relative to said inner hub causes said plungers to cam out of said recesses, a first spacer located between said clutch plate and said inner hub and piloting said inner hub central to said outer hub, and anti-rotation tabs on the periphery of said spacer received in notches in said outer hub.

2. A clutch driven plate assembly as set forth in claim 1, wherein a second spacer is located between said outer hub and said spring retainer plate and anti-rotation tabs on said second spacer received in openings in said spring retainer plate.

3. A clutch driven plate assembly as set forth in claim 2, in which said inner hub and spring-biased plungers are axially retained in place by said spacers.

4. A clutch driven plate assembly as set forth in claim 2, including a wave spring between said second spacer and said spring retainer plate, and a stop on said second spacer adapted to engage said spring retainer plate to prevent the wave spring going solid.

5. A clutch driven plate assembly as set forth in claim 2, including friction surfaces on said first and second spacers engaging said clutch plate and said inner and outer hubs, respectively.

6. A clutch driven plate assembly as set forth in claim 1, wherein said spring windows in said plates and outer hub all have the same circumferential dimension.

7. A clutch driven plate assembly as set forth in claim 1, wherein said intermeshing splines have sufficient clearance therebetween so as to allow limited rotation of said plates, damper springs and outer hub relative to said inner hub without compression of said damper springs.

8. A clutch driven plate assembly as set forth in claim 1, wherein said inner hub has said camming recesses circumferentially equally spaced between said splines, and said outer hub has radially extending recesses receiving said spring-biased plungers radially aligned with said camming recesses.

9. A clutch driven plate assembly as set forth in claim 8, wherein each plunger receives a camming nose received in a camming recess and a rearwardly opening third recess, and a compression spring in each radially extending recess with one end received in said plunger recess.

* * * * *